(12) United States Patent
Dorhmi et al.

(10) Patent No.: US 8,175,905 B2
(45) Date of Patent: May 8, 2012

(54) SOURCE ALLOCATION SYSTEM, PROGRAM AND METHOD

(75) Inventors: Samir Dorhmi, Fontenay sous Bois (FR); Jacques Potier, Saran (FR); Michel Valette, Montigny le Bretonneux (FR); Michel Monteil, Paris (FR)

(73) Assignee: France Telecom, Paris (FR)

( * ) Notice: Subject to any disclaimer, the term of this patent is extended or adjusted under 35 U.S.C. 154(b) by 1196 days.

(21) Appl. No.: 11/794,640

(22) PCT Filed: Dec. 23, 2005

(86) PCT No.: PCT/FR2005/003273
§ 371 (c)(1),
(2), (4) Date: Aug. 28, 2007

(87) PCT Pub. No.: WO2006/072696
PCT Pub. Date: Jul. 13, 2006

(65) Prior Publication Data
US 2009/0281858 A1 Nov. 12, 2009

(30) Foreign Application Priority Data
Jan. 3, 2005 (FR) ...................................... 0500018

(51) Int. Cl.
*G06Q 10/00* (2006.01)
(52) U.S. Cl. ...................... 705/7.12; 705/7.22; 705/7.23
(58) Field of Classification Search .......................... None
See application file for complete search history.

(56) References Cited

U.S. PATENT DOCUMENTS

| | | | | |
|---|---|---|---|---|
| 5,524,244 | A * | 6/1996 | Robinson et al. | 717/140 |
| 6,151,582 | A * | 11/2000 | Huang et al. | 705/7.25 |
| 6,591,272 | B1 * | 7/2003 | Williams | 1/1 |
| 2002/0013631 | A1 * | 1/2002 | Parunak et al. | 700/28 |
| 2003/0081757 | A1 | 5/2003 | Mengshoel et al. | |
| 2003/0208527 | A1 * | 11/2003 | Lglesais et al. | 709/203 |
| 2006/0143220 | A1 * | 6/2006 | Spencer | 707/102 |

OTHER PUBLICATIONS

Alexander Redlein, Fulffiling Customer's Needs by the Use of a Variant Configurator for Dynamic Product Definition IUCCIM, Vienna University of Technology, Treitlstratle 1, A-1040 Vienna, Austria.*
C. Meirina, et al. Real-time Agent-based Decision Support System to Facilitate Effective Organizational Adaptation Dept. of ECE, Univ, of Connecticut, Storrs, CT 06269-1157, USA.*
Meirina et al., "Real-time Agent-based Decision Support System to Facilitate Effective Organizational Adaptation," 2004 IEEE International Conference on the Systems, Man and Cybernetics, The Hague, The Netherlands, Oct. 10-13, 2004, IEEE, vol. 3, pp. 2681-2686, Piscataway, NJ, USA (Oct. 10, 2004).
Redlein, "Fulfilling Customer's Needs by the Use of a Varian Configurator for Dynamic Product Definition," 7$^{th}$ IEEE International Conference on Emerging Technologies and Factory Automation, Barcelona, Spain Oct. 18-21, 1999, Proceedings, ETFA'99, IEEE, vol. 1, pp. 735-742, Piscataway, NJ, USA (Oct. 18, 1999).

* cited by examiner

*Primary Examiner* — Thomas Dixon
*Assistant Examiner* — Gerald Vizvary
(74) *Attorney, Agent, or Firm* — Drinker Biddle & Reath LLP

(57) ABSTRACT

The invention relates to a resource allocation method. According to the invention, databases of computer objects are produced solely with properties intrinsic to the physical objects. Data filters are defined in order to sort the different intrinsic properties and to divide same into object classes. Allocation matrices are then used to match the resources with the object classes. During the handling of a process, the allocation method is implemented in order to determine a resource. A database is queried in order to obtain intrinsic information. Subsequently, the intrinsic information passes through a data filter in order to determine a membership class. One or more resources are then determined from the membership class with an allocation matrix. The inventive method is performed with the aid of a computer program. The invention also relates to a processing system which is designed to implement said method.

9 Claims, 3 Drawing Sheets

SOURCE ALLOCATION SYSTEM, PROGRAM AND METHOD

CROSS-REFERENCE TO RELATED APPLICATIONS

This application is the U.S. national phase of the International Patent Application No. PCT/FR2005/003273 filed Dec. 23, 2005, which claims the benefit of French Application No. 05 00018 filed Jan. 3, 2005, the entire content of which is incorporated herein by reference.

BACKGROUND OF THE INVENTION

The invention relates to automated industrial processes used in a large company. More particularly the invention relates to the automatic allocation of resources able to carry out a type of action in an industrial process.

In the present document, the term "industrial process" covers any process used in a company in order to carry out a given job necessitating the completion of several tasks. A process can be defined as a set of tasks organized as a system sequentially or in parallel, combining and implementing multiple resources of the company.

Each task can be defined as the transformation of one or more start-of-task objects into one or more end-of-task objects by carrying out one or more actions using one or more operational resources. A task can be carried out as soon as operational conditions are satisfied and subject to time and availability of the resources carrying out the task.

The breakdown of a process into tasks is recursive. Each task can itself be broken down into sub-tasks. The carrying out of a task broken down into sub-tasks itself constitutes a process. The breakdown of a task into sub-tasks can be stopped as soon as it is no longer possible or necessary to break down the task. In practice, processes are broken down into tasks and sub-tasks according to a degree of supervision of the process and according to the capabilities of action of the operational resource allocated to a task.

An industrial process can start on accepting an order and can comprise all of the intermediate tasks to be carried out by the company up to the delivery of the product, the delivery constituting the last task of the process. The product provided by the company depends on the sector of activity of the company and can correspond to a physical product but also to a provision of service. The implementation of an industrial process also calls upon various operational resources of the company.

The term "operational resource" must be understood to mean an element of the company having an active role in a process, that is to say able to carry out at least one action during at least one task of a process. In the present document, a resource can be of different nature according to the types of task and of action to be carried out. A production site is an operational resource capable of producing different types of products. However, within this production site, a production team, a production line, or even a robot constitute separate operational resources able to carry out more limited manufacturing actions. An intervention team is an operational resource intended to intervene for certain types of actions (fault repair, maintenance or other service action) to be carried out in a given geographic zone.

Information technology is allowing companies to increasingly automate the running of an industrial process. This is because a client can place an order online through the Internet. The order can then be processed automatically by a server which controls the industrial process relating to the products ordered by sending to various resources of the company action instructions to be carried out. According to the various possible configurations, a single server can supervise all of a process, or the process is managed successively by the various resources used.

Without using completely automated industrial resources, companies also use computer assistance for managing processes when a participant of the company cannot know the whole of the data of a company. This is particularly the case of large companies which have a wide geographic presence and a wide range of clients, products and/or resources.

However the process is managed, this management calls upon databases. A database contains information relating to a category of physical objects. The totality of the information relating to a physical object commonly corresponds to a computer object. A computer object is a set of information structured according to an object type. The object type is determined according to information relating to the physical objects that are wished to be described in the database. A database is a set of computer objects defined according to an object type. An object type currently comprises characteristics belonging to physical objects and information relating to the processing carried out on said physical objects.

Thus, for a file of clients to whom service provisions are offered, the database comprises an object associated with each client. The structure of each object comprises, on the one hand, information specific to the client and, on the other hand, information specific to the resources responsible for the various services for that client. Thus, when an order is accepted, the interrogation of the database makes it possible to allocate a resource of the company for a requested service according to the properties relating to the client.

In the case of a catalog of physical products, a products file is a database which comprises objects representative of the products. Each object comprises information specific to the product and information indicating for each product or for each category of products the resource or resources of the company used in the processing carried out on the product.

In general, for a given category of physical objects, there is a database which comprises computer objects representative of the physical objects. Each computer object comprises information specific to each physical object and information relating to the processing of each physical object. Thus, during the running of a process, the interrogation of the database makes it possible, for an action or a task to be carried out, to know which resource is concerned.

Such a database structure raises a problem of keeping databases updated. When a company is reorganized, the latter modifies the distribution and activity of its resources. It is then necessary to review the integrality of the databases in order to modify all of the information relating to the allocation of resources. Large companies are reorganized regularly in order to optimize their operational functioning; the non-operational costs generated by operations of this kind are large.

Moreover, each company adapts the structure of its databases according to its needs. The fusion of two companies adds to the problems of reconciliation of the intrinsic properties of the databases of the companies concerned a problem to be solved relating to the static reallocation of resources in order to link them with the objects of the databases concerned.

SUMMARY OF THE INVENTION

The purpose of the invention is to solve the problems mentioned. Databases of computer objects are produced solely with the intrinsic properties of the physical objects.

Data filters are defined in order to sort the various intrinsic properties in order to distribute them into object classes. Allocation matrices are then used to match the resources with the object classes.

During the processing of a process, an allocation method is implemented in order to determine a resource automatically. Starting from the request by the device specifying the type of action to be carried out and the identifier of the object, the device interrogates the database concerned in order to obtain intrinsic information relating to the object. The intrinsic information passes through a data filter in order to determine a membership class. Starting with the membership class, an allocation matrix makes the link with one or more resources.

More particularly, the invention is a method of allocating resources in a dynamic process having actions to be carried out relating to physical objects using at least one database, at least one data filter and at least one allocation matrix. The database comprises a plurality of computer objects corresponding to physical objects, each computer object comprising a plurality of characteristics intrinsic to the corresponding physical object. The data filter establishes rules of membership to membership classes according to the intrinsic characteristics. The allocation matrix matches one or more resources with a membership class. On receiving a request comprising a type of action to be carried out relating to a physical object, the following steps are carried out:

a/ interrogation of the database in order to obtain intrinsic characteristics of the physical object, b/ submission of the intrinsic characteristics to the membership rules of the data filter and determination of the membership class when the associated membership rule is verified by the intrinsic characteristics of the physical object, c/ determination of the resource to use by means of the membership class and the allocation matrix.

Prior to the determination method, a request having to result in the determination of a request is received by the processing device. The request contains a type of action to be carried out. According to a particular embodiment, the allocation matrix comprises for each membership class a list of at least two resources corresponding to at least two types of action to be carried out, each type of action being associated with a resource in said list. The type of action to be carried out being indicated by the process, step c/ determines the resource to be used depending on the type of action to be carried out.

Because of the invention, databases no longer need to contain the resources information which is contained in the allocation matrices. When the resources are very much fewer in number than the computer objects, this makes it possible to reduce considerably the size necessary for storing information. Moreover, it is possible to have several data filters and several allocation matrices for the same database, which makes it possible to use centralized databases with filters appropriate to the resources which use them. A fine breakdown of the tasks of a process makes it possible to use data filters and allocation matrices of small sizes.

In the case of reorganization, the databases are no longer modified. It suffices to modify the allocation matrices and possibly the filters and this considerably reduces the updating operations.

The invention can be embodied in the form of a computer program comprising portions of code executable by a computer for implementing the method. The invention also covers the data recording medium readable by a computer which comprises the program as well as the online provision of said computer program.

According to another aspect, the invention is a process implementing tasks relating to physical objects. For a task to be carried out on a physical object, the process determines a type of action to be carried out and then carries out the process of resource allocation in order to determine the resource to be used in order to carry out the task.

According to yet another aspect, the invention is a system of processing at least one task of a process, which comprises: at least one database of computer objects, each computer object including an identifier and a plurality of characteristics intrinsic to the physical object; at least one data filter establishing rules of membership to membership classes according to intrinsic characteristics; at least one allocation matrix matching one or more resources to a membership class; processing means to interrogate the database in order to obtain intrinsic characteristics, in order to submit the intrinsic characteristics to the membership rules of the data filter in order to determine the membership class of the object and in order to determine the resource to be used by means of the membership class and the allocation matrix.

DETAILED DESCRIPTION OF THE INVENTION

Processes can be very complex and numerous models allow them to be represented. As the invention is independent of the number and complexity of the processes used, reference is made to one model and simplified examples in order to aid the comprehension of this document. The invention can be applied to all processes and it becomes increasingly advantageous as the implementation of the process becomes more complex.

Figure 1:
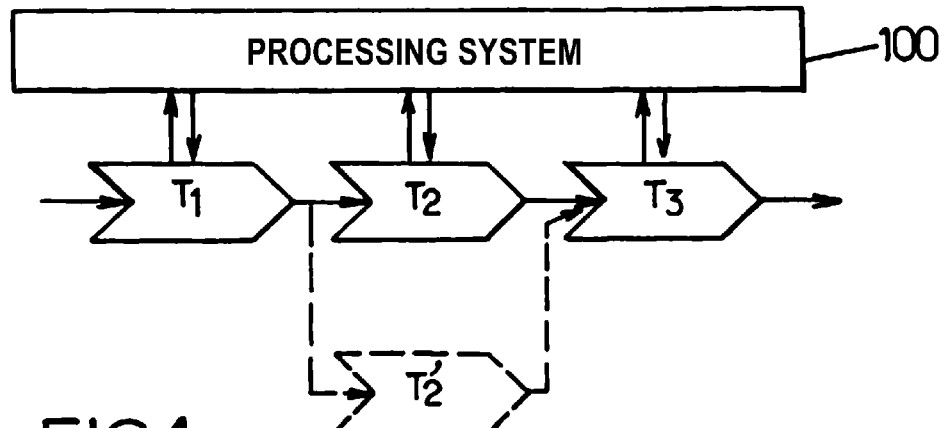
FIG. 1 illustrates the running of an industrial process.

FIG. 1 shows a simple breakdown of an industrial process into three tasks $T_1$, $T_2$ and $T_3$. The process can of course be more complex and can carry out tasks in parallel, such as shown in dotted line with the task $T'_2$. A processing system 100 interacts with the tasks $T_1$ to $T_3$ in order to ensure the correct running of the process. It is at the processing system 100 that are located the databases allowing the resource allocations.

Figure 2:
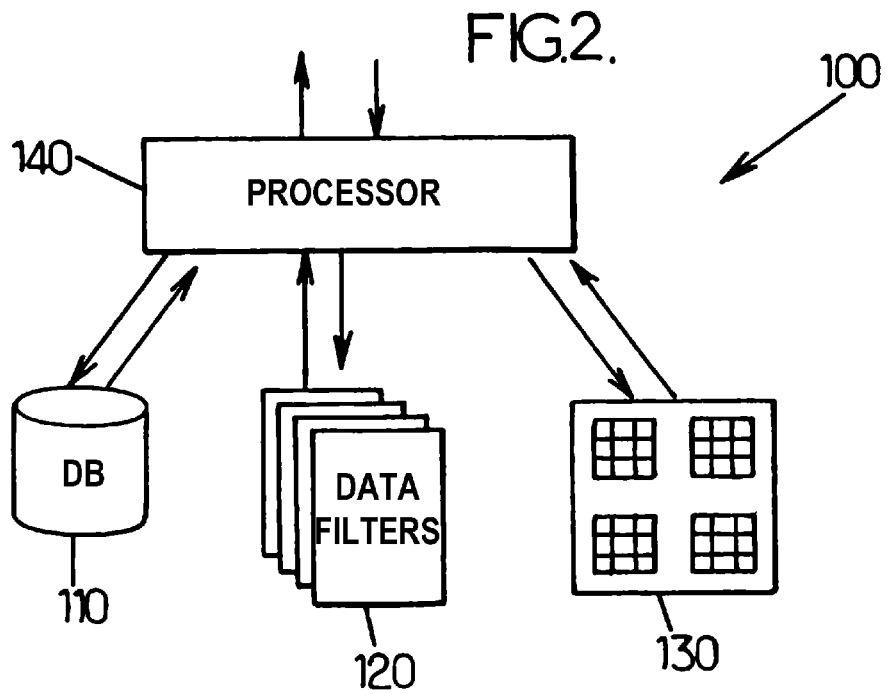
FIG. 2 illustrates a resources allocation system according to the invention.

The processing system 100 is a computer system constituted by one or more computers making it possible to retain the data of the company and to carry out processing on these data. An example of a processing system 100 is shown in FIG. 2. The processing system 100 comprises a database 110, data filters 120, allocation matrices 130 and processing means 140.

The databases 110, the data filters 120 and the allocation matrices 130 are stored on one or more hard disks belonging to one or more computers and are not necessarily stored in the same place. Preferably, the databases 110 are centralized for the whole of the company when all of the operational resources of the company are able to be accessed there.

The processing means 140 are constituted by one or more computers having programs for accessing the data and carrying out processing on the databases 110, the data filters 120 and the allocation matrices 140.

As a first example, task $T_1$ is the acceptance of an order for a product manufactured on request and including its installation at the client's premises. Task $T_2$ is a task of manufacturing the ordered product. Task $T_3$ is the delivery and installation task.

Task $T_1$ consists in collecting the data for the initialization of the process, these initialization data correspond to an order form identifying the client and the ordered products and services. The order form is then transmitted to the next resource for the continuation of the process.

The operational resource responsible for the order acceptance task $T_1$ is contacted directly by the client and there is no need to determine it. This operational resource is for example a salesman capable of exchanging data with the processing system 100. The salesman can also be a computer server connected to the Internet on the one hand and to the processing system 100 on the other hand. The salesman, for generating the order form, needs to identify the client and the ordered products and services. During this task, the salesman interacts between the client and the processing system 100.

In order to identify the client, the salesman asks him for his name and checks if the client is already recorded as a client in one of the databases 110 corresponding to a database whose objects correspond to clients. If it is a new client, the salesman requests information relating to the client, such as for example: his name, his address, possibly a delivery and invoicing address, the method of payment used, possibly a payment period, and possibly other optional information not essential for the order in progress. The information relating to the client is then updated in the database.

The salesman again interrogates the database 110 in order to obtain the catalog of products (database where the objects correspond to products) and the catalog of services (database where the objects correspond to services) in order to allow the client to make his choice. The interrogation of the catalogs makes it possible to obtain all of the characteristics of the products and services allowing the client to choose the product most suited to his needs.

Figure 3:
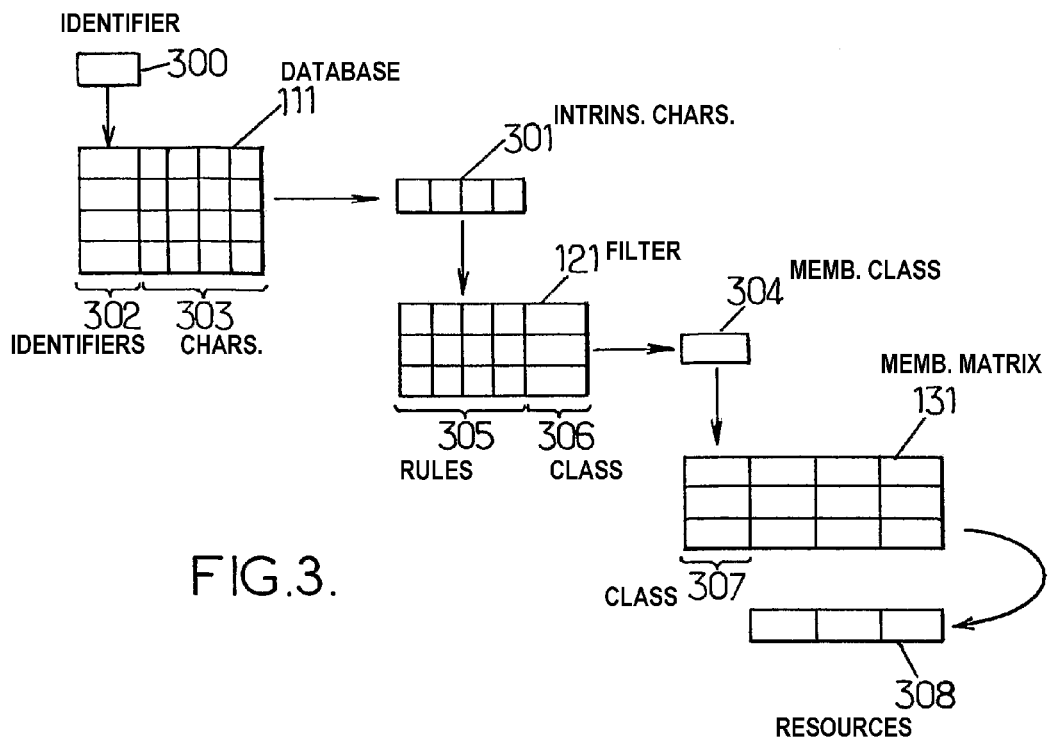
FIG. 3 shows an example of data processing used to assist the method according to the invention.
Figure 4:
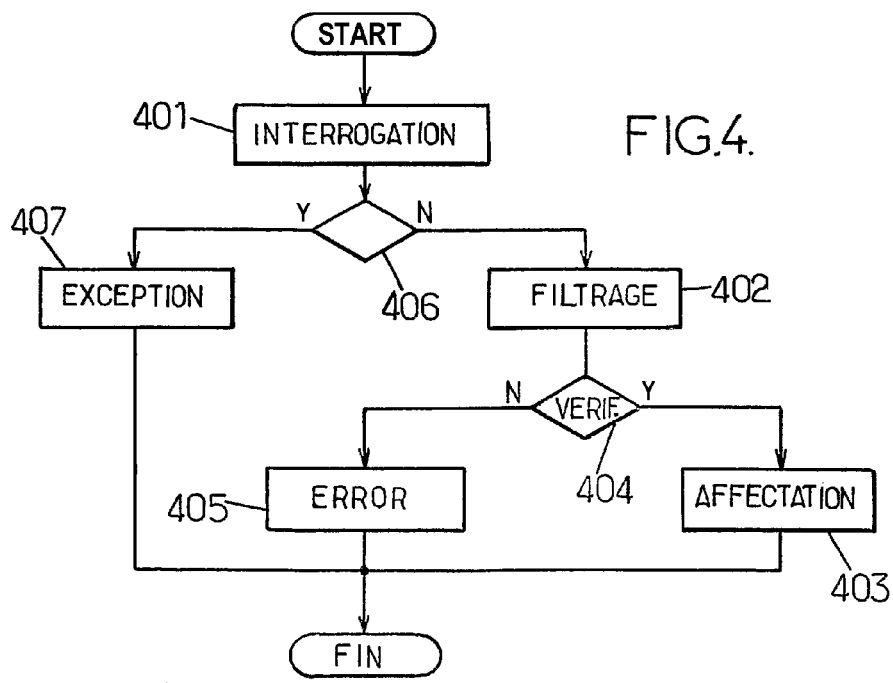
FIG. 4 is a flowchart of the method according to the invention.

The client having chosen a product accompanied by an installation service, the salesman can draw up his order form and send it to the next resource in order to carry out the manufacturing task $T_2$. The operational resource responsible for the task $T_2$ is a manufacturing unit. In order to determine the manufacturing unit the salesman implements the automated method described jointly with reference to FIGS. 3 and 4.

The salesman provides an identifier 300 of the product to the processing system 100 in order to obtain the manufacturing unit capable of producing said product. The processing means 140 interrogate the databases 110 (step 401) and more particularly the database 111 which references the products in order to obtain the intrinsic characteristics 301 of the product. To this end, the database is for example constituted by a table comprising a column of identifiers 302 and a plurality of columns of characteristics 303.

The intrinsic characteristics 301 are then submitted to a filter 121 (step 402) to determine a membership class 304. The filter 121 is one of the filters 120 allocated to the products of the database 111 in order to determine the resource concerned in order to carry out different types of tasks on the product which are, for example, its production, its repair or its recycling. Each filter 121 comprises a list of conditions 305 and a list of classes 306. The list of conditions 305 defining a plurality of series of conditions based on the characteristics of the products. Each series of conditions is associated with a membership class in the list of classes 306. The processing means 140 check the series of conditions and provide the membership class associated with a series when the conditions are verified with the aid of the extracted characteristics 301.

The processing means 140 then determine the resource concerned (step 403) with the aid of the membership class 304 and of a membership matrix 131. The membership matrix 131 is one of the matrices 130 associated with the filter 121. The matrix 131 comprises a list of classes 307 identical to the list of classes on the filter 121. For each membership class, the matrix 131 matches a series of resources 308 corresponding to different tasks or types of action to be carried out on a product belonging to the membership class 304. The determination of the resource to be used is carried out by retrieving the series of resources 308 associated with the membership class and by selecting from among these resources the one which corresponds to the task or to the type of action to be carried out.

If the example of computer equipment ordered online is taken, the client will choose his product from a catalog of computers. The catalog of computers constitutes a database whose objects correspond to computers. The computers of the catalog are for example grouped into models of computers each having a certain number of internal components able to be changed optionally as well as additional options. The characteristics of each computer in the catalog reflect one of the different possible configurations of options. This catalog of computers comprises a list of combinations that the manufacturer offers to sell taking account of the compatibility between the options and the commercial advantage of each combination offered.

Such a catalog can comprise several thousand products whereas the manufacturer only has a few production units, for example five. The integration of the indication of the production unit in the products database is not very flexible in use if it is desired to modify the distribution of the production between the production units, which occurs regularly depending on the size of the orders for certain products and of stocks of components of the different production units.

On the other hand, it is possible to determine a number of membership classes that is much smaller in number than the number of products. The higher the ratio between the number of objects of a database and the number of membership classes, the greater the savings in storage size become. Preferably, the number of membership classes is greater than the number of production units in order to allow more flexibility in the organization of the production.

By way of example, fifty membership classes can be used. The membership conditions are determined according to the characteristics present in the catalog of products and can take into account only a reduced number of characteristics defining the product. Preferably, the classes are defined in order to group a number of products of the same order of magnitude. The catalog of products containing for example 1500 products, each one of the fifty classes groups for example between 15 and 50 products.

The matrix 131 is established for matching each membership class with a unique resource for a task to be accomplished. A same resource can be used for several tasks. The different tasks directly linked with a product being its manufacture, its repair and its recycling. A production unit principally carries out the manufacture of a product, but it can also carry out the repair or the dismantling for the purpose of recycling various components of a product if the company does not have a more specialized independent unit.

The filling of the matrix should ideally take account of the states of the different production units as well as the probabilities of selection of the membership classes. The status of stocks of parts used in the manufacture of a computer fluctuates constantly as a function of the products manufactured and of the deliveries. Similarly a probability of selection of a membership class can depend on the desires of clients, which evolve in periods. Whatever the distribution of the resources in the matrix 131 may be, this distribution will have to be changed over a more or less long term in order to respond to parameters which evolve over time.

A big advantage of the invention is that only the matrix 131 can be modified in most cases. In fact, the number of membership classes being greater than the number of production units, it is possible to modify very simply the distribution of resources with respect to the membership classes at any time. The modifications of the matrix can be carried out according to the status of the stocks of components in the manufacturing units and according to the queue at each unit. It is thus possible to act on the matrix in order to distribute the production dynamically.

If a distribution of resources in the matrix does not make it possible to obtain sufficient flexibility of use, it is appropriate to modify the filter 121 by increasing the number of membership classes or by redefining the series of conditions. Such an operation is a little more complex to carry out than a simple distribution in the matrix. It occurs very infrequently however.

The adding of a new product in the catalog can be compatible with the filters. A new product comprises a combination of characteristics which can already be classable in one of the membership classes. However, it is possible that a new product comprises a characteristic excluding it from all of the membership classes.

Two possibilities are offered. A first possibility (test 404) consists in checking if a membership class has been associated with the characteristics of the product by the filter 121. If no class is found, then a processing error is detected (step 405). The processing error can then be indicated in order to be corrected.

The determination of the resource to be allocated is then done manually. The correction of such an error consists in modifying the membership classes.

A second possibility, offering more flexibility in reactivity, consists in defining a normally empty membership class whose condition is that none of the other conditions of the filter is verified. It is then possible to allocate a resource, for example capable of processing all new products. If this class is called upon too much, it is appropriate to modify the other conditions of the filter.

Moreover, in order to be able to cover all possible cases, it is appropriate to provide an exceptional processing possibility. The expression "exceptional processing" must be understood to mean a processing only possible in rare cases. The exceptional character of the processing can result from several reasons. It is for example possible not to have intrinsic and generic properties compatible with the definition of computer objects in the database. It is also possible not to be able to define logic of association which would make it possible to allocate an operational resource according to properties of the object due to lack of distinctiveness of the intrinsic characteristics of the database. In the case of a catalog of products, this can correspond to the presence of an option that is very infrequently requested and which prevents the production by the resources of the company according to a conventional process of the company.

After step 401 of extracting characteristics of the product from the database 111, and before step 402 of submission of these extracted characteristics 301 to the filter 121, it is appropriate to check if it is a product necessitating an exceptional processing (test 406). The exceptional nature of the product can be detected either by the identifier of the product and a table listing the identifiers of products of exceptional nature, or by carrying out a test on the intrinsic characteristics in order to detect a characteristic of exceptional nature.

If it is an exceptional product then an exceptional processing is implemented (step 407). For an exceptional product, the resource to be allocated is known and can correspond to a resource capable of processing non-exceptional products possibly in another context. If the exceptional nature results from an option preventing the use of automatic machines installed on production lines, the assembly can nevertheless be carried out for example by a team which normally provides the repair of products and which is less automated.

In the case where several exceptional products have different processing, an automatic allocation method is initiated which concerns exceptional products only. The automatic allocation of resources can be carried out according to a more conventional technique using a database relating uniquely to exceptional products which corresponds to a copy of the database of the products in which the resources are indicated. It is also possible to use an allocation method similar to that used for non-exceptional objects. The exceptional objects being rare by definition, the additional data necessary for the processing of exceptional nature are limited in number.

The manufacturing unit having been allocated during task $T_1$, task $T_2$ can be carried out. As mentioned before, the task $T_2$ can itself be broken down into sub-tasks. By way of example, the task $T_2$ of production of a computer can be broken down into several sub-tasks, one or more sub-tasks of assembly of interface cards on a motherboard, a sub-task of configuration of the operating system on a hard disk according to the hardware options chosen, one or more sub-tasks of assembly in the casing of the motherboard and peripherals built into the casing, packaging and other sub-tasks.

Here again, allocations of resources are possible according to the allocation method mentioned above with reference to FIGS. 3 and 4. The database of the catalog of products is the same. The filter or filters used can be the same or can be defined differently because it is no longer a matter of distributing a production load between manufacturing units but one of distributing machines and assembly teams for carrying out very precise tasks according to the characteristics of the products.

The allocation matrix or matrices can comprise for each membership class one or more series of resources different in number from those of the matrix 131. This is because, the number of sub-tasks being greater, it is appropriate to be able to allocate one resource for each sub-task. It is possible to have matrices which group the resources allocated to sub-tasks carried out in parallel, such as, for example, the assembly of cards on the motherboard carried out by an assembly robot and the configuration of the operating system carried out by robot software.

The combination of the invention with robots is particularly advantageous. The order form, in electronic format, makes it possible to choose automatically the robots and can furthermore make it possible to retrieve the robot's orders stored in the matrix. Human intervention takes place uniquely on the allocation matrices depending on the configurations of the robots.

A card assembly robot can be configured for one or more types of motherboard and can for example insert a card in the motherboard from a choice of cards present in the magazine of said robot. Two different products can thus be processed by the same robot for the assembly of a card and by two different robots for the assembly of a following card. The matrix can indicate the robot to be used and also, to the robot, the type of motherboard, the location selected on the motherboard and the magazine of the robot corresponding to the card to be assembled.

Robot software responsible for configuring the operating system of the computer during the manufacture can be allocated depending on the type of operation system chosen by the client. The parameterization of the configuration is carried out for example with the aid of a portion of the parameters of the product describing the hardware configuration of the computer.

Figure 5:
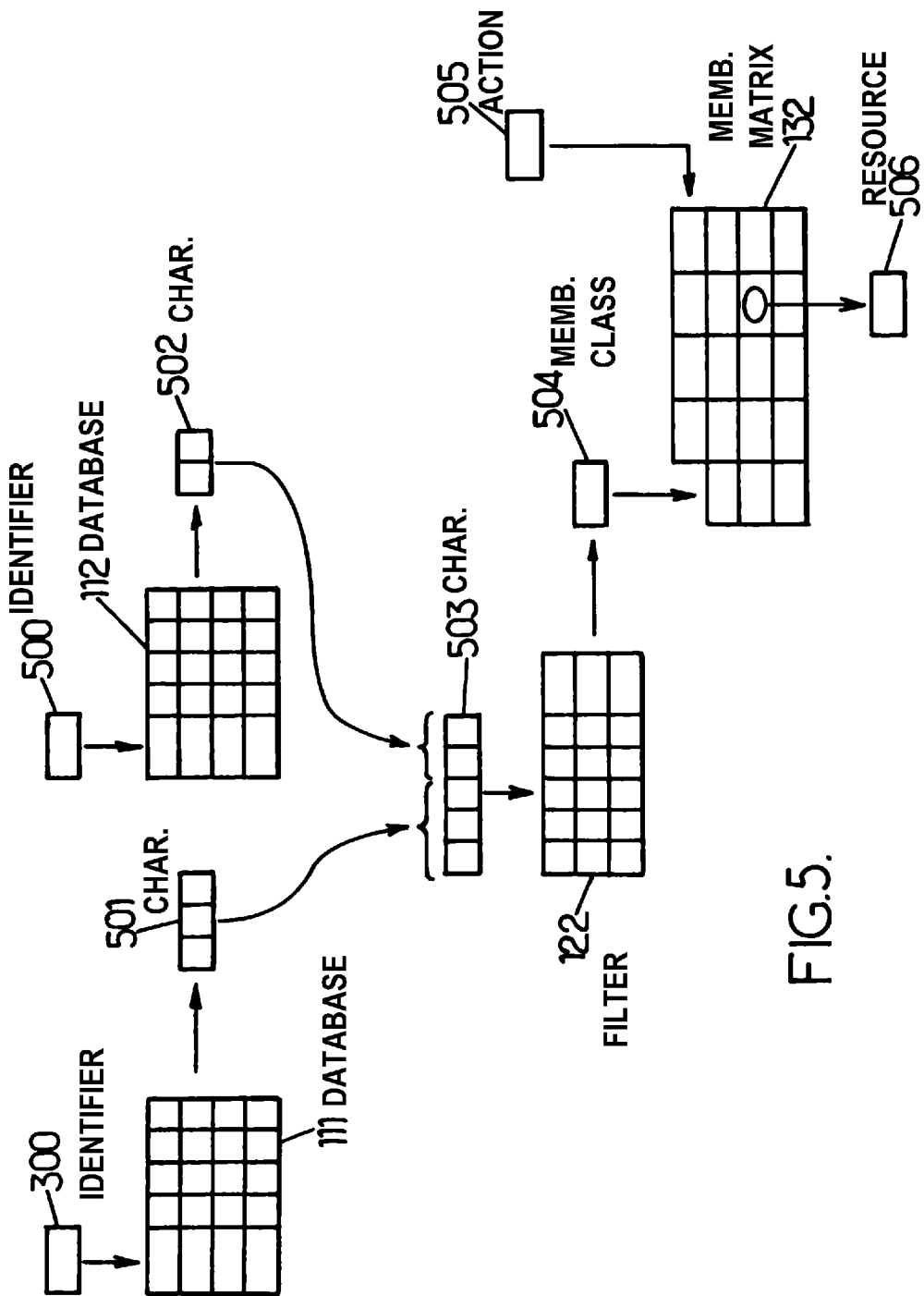
FIG. 5 shows a variant data processing used in the method according to the invention.

Task $T_2$ ends when all of the manufacturing sub-tasks are completed. At the end of task $T_2$, it is appropriate to determine which resource will carry out the delivery and installation of the product at the client's premises. The delivery depends on the delivery address specified in the client database. The installation can depend on the product. The allocation of a team shows a possible variant embodiment of the invention referring to FIGS. 4 and 5.

The determination of the resource responsible for task $T_3$ is carried out by performing a step 401 of interrogation of databases in order to obtain the necessary characteristics. An identifier 300 of the product and an identifier 500 of the client are provided to the processing system. The processing means 140 interrogate, on the one hand, the products database 111 and, on the other hand, the clients database 112, both databases being part of the databases 110. In this variant, it is not the totality of the characteristics of the product and of the client that are used but only a significant portion in order to determine the resource responsible for task $T_3$. For the product, only characteristics making it possible to define the competence of the resource are necessary, for example the type of operating system, the type of connection to the Internet and the possible external peripherals to be connected to the computer. For the client, the delivery address can suffice to determine the "delivery team" resource to be called upon. The characteristics 501 and 502 coming from databases 111 and 112 are then regrouped in order to form a group of characteristics 503.

The processing means 140 check during the test 406 that there is no exceptional processing to implement either on the product or on the client before proceeding to the filtering step 402. The characteristics 503 are submitted to a filter 122 to determine a membership class 504. The filter 122 is one of the filters 120 allocated to the products of the database 111 and to the clients of the database 112 in order to determine the resource concerned for carrying out a delivery task possibly including an installation. The processing means 140 carry out the verification of the series of conditions of the filter 122 and determine the membership class 504 associated with the series which verifies the conditions on the characteristics 503.

If there is a definite membership class, the allocation step 403 is then carried out. The processing means 140 determine the resource, providing to a membership matrix 132 on the one hand the membership class 504 and on the other hand the type of action 505 to be carried out. The membership matrix 132 is one of the matrices 130 associated with the filter 122. The matrix 132 differs from the matrix 131 in that it has a direct selection of type of action over a series of resources corresponding to a delivery/installation task to be carried out on a product/client pair belonging to the membership class 504. The type of action to be carried out is for example a simple delivery, a delivery with connection to the Internet by a cable, a delivery with connection to the Internet by a link of the xDSL type, or another installation possibility. The determination of the resource 506 to be used is carried out by taking a resource associated with the membership class 504 and with the type of action 505.

As seen previously, the number of products is of the order of a few thousand. With regard to the clients, their number can be even greater, of the order of a hundred thousand. The number of product/client pairs is accordingly greater. Depending on the type of installation, there can be different teams which have the necessary technical abilities. Moreover, the team will have to be chosen according to the location of the place of delivery. The number of membership classes is chosen in order to allow both the distribution of technical competence and a geographic breakdown sufficiently fine to have a certain flexibility of reorganization. The fineness of the geographic breakdown is for example determined according to the number of teams available with a multiplier factor for example equal to ten.

Many uses of the invention are possible. By way of example in order to illustrate the advantage gained in terms of management simplicity, the invention can be used to carry out maintenance operations on the network of a telephone operator. A telecommunications network in a country such as France comprises several hundred thousand network nodes. Each network node can correspond to a computer object of a database. The characteristics of the network node comprise a description of the hardware constituting the network node, the location of the node, its hierarchic level in the topology of the network, the types of connections made by the node and possibly other information specific to the node.

The maintenance teams, for example 100, are distributed over the territory and have abilities allowing them to act on some pieces of hardware and not on others. They can be of different sizes and have different work timetables. The maintenance teams can be responsible for different tasks such as, for example, simple periodic maintenance, non-critical fault repair (in cases of a non-blocking fault), a possible emergency breakdown repair over three possible time slots.

It should be noted that the structure of a network node varies little and therefore the network nodes database can retain the same structure over a relatively long period of the order of ten years. A large reorganization of the maintenance teams able to result in a modification of the filters can occur every two years. Also, a reorganization of the allocation of intervention teams resulting in a modification of the allocation matrices can take place several times in one year.

Moreover, in an example of a large-sized database, other advantages are to be taken into consideration. With the invention, the resources pointers are centralized in the allocation matrices 130 by the intermediary of data filters 120. In comparison with a state of the art which includes the resources pointers in the objects databases, the number of pointers is considerably reduced. By way of example, if for one type of object five resources can be allocated and the database comprises 100,000 objects then 500,000 resources pointers are necessary. This number of resources pointers is considerably reduced due to the invention.

In fact, with the invention, by defining 2000 membership classes, the number of resources pointers is reduced to 10,000 to which it is necessary to add 2000 membership class pointers. The total number of pointers is thus reduced to 12,000. Such a reduction provides as an advantage the reduction of processing of the pointers to be carried out and therefore of necessitating less powerful computers in terms of the number of operations to be carried out. Another less important advantage is the reduction in the amount of stored information representing the pointers.

By way of additional example, the client file of a telephone system operator reaches 30 million clients. For each client, service provisions or interventions can be carried out by various resources of the operator at the client's request. The saving in such a database is even more consequential in terms of organization. Furthermore, the advantages related to the reduction in the number of pointers are even greater.

Those skilled in the art will understand that a very large number of variants of the invention are possible according to the configurations. One or more databases can be interrogated for a single resources allocation depending on the case to be processed. One or more filters can be defined for a database. At least one allocation matrix per filter is used.

The invention claimed is:

1. A method of allocating resources in a dynamic process relating to physical objects, the method comprising:
   receiving a request specifying a type of action to be carried out and an identifier of a physical object;
   interrogating at least one database in order to obtain intrinsic characteristics of the physical object;
   submitting the intrinsic characteristics to membership rules of at least one data filter and determining a membership class when the associated membership rule is verified by the intrinsic characteristics of the physical object;
   determining resources to use for the physical object by way of the membership class and of at least one allocation matrix; and
   carrying out the requested action relating to the physical object using the determined resources;
   wherein:
   the at least one database comprises a plurality of computer objects corresponding to physical objects, each computer object comprising a plurality of characteristics intrinsic to the corresponding physical object;
   the at least one data filter establishes rules of membership to membership classes according to the intrinsic characteristics;
   the at least one allocation matrix matches one or more resources with a membership class.

2. The method as claimed in claim 1, wherein the allocation matrix comprises for each membership class a list of at least two resources corresponding to at least two types of action to be carried out, each type of action being associated with a resource in said list and wherein determining the resource to be used is achieved on the basis of the type of action to be carried out that is indicated in the received request.

3. The method as claimed in claim 1, wherein, before submitting the intrinsic characteristics to membership rules of at least one data filter and determining a membership class, it is determined if the object is an object whose processing conforms with a normal allocation of resources.

4. The method as claimed in claim 1, wherein, if the membership class cannot be determined, then a processing error is detected.

5. The method as claimed in claim 1, wherein the filter comprises a membership class whose membership rule corresponds to the non-verification of all of the other membership rules of the filter.

6. A non-transitory recording medium that can be read by a computer, the medium storing a computer program comprising portions of code, which, when executed by the computer, cause the computer to carry out the method as claimed in claim 1.

7. A system storing a computer program in a non-transitory data store and making the computer program available for download by a computer, the computer program comprising portions of code, which, when executed by the computer, cause the computer to carry out the method as claimed in claim 1.

8. A method according to claim 1 wherein the implementing of tasks relating to physical objects, for a task (T1-T3) to be carried out on a physical object, the method determines a type of action to be carried out and then carries out the method in order to determine the resource to be used to carry out the task.

9. A system for processing at least one task of a process, which comprises:
   at least one database of computer objects, each computer object including an identifier and a plurality of characteristics intrinsic to the physical object;
   at least one data filter establishing rules of membership to membership classes according to intrinsic characteristics;
   at least one allocation matrix matching one or more resources to a membership class;
   a processor to receive a request specifying a type of action to be carried out and an identifier of a physical object, to interrogate the database in order to obtain intrinsic characteristics, in order to submit the intrinsic characteristics to the membership rules of the data filter in order to determine the membership class of the object and in order to determine the resource to be used by way of the membership class and the allocation matrix, and to cause the system to carry out the requested action relating to the physical object using the determined resources.

* * * * *